April 15, 1958     R. E. PENFOLD ET AL     2,830,725
HOPPER LID AND HINGE
Filed Sept. 6, 1955
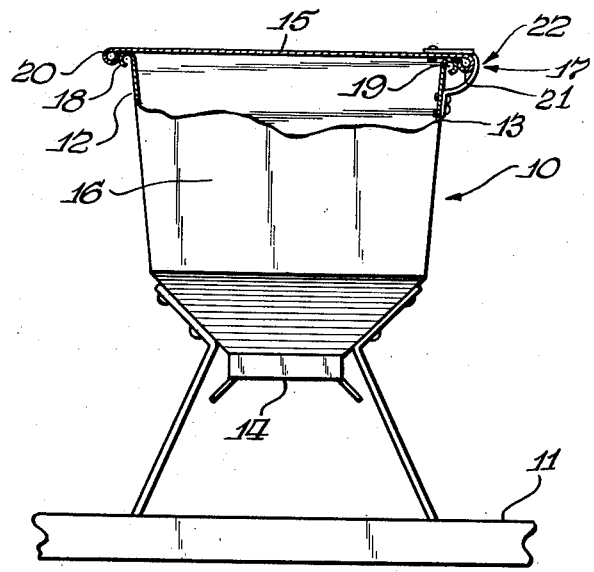
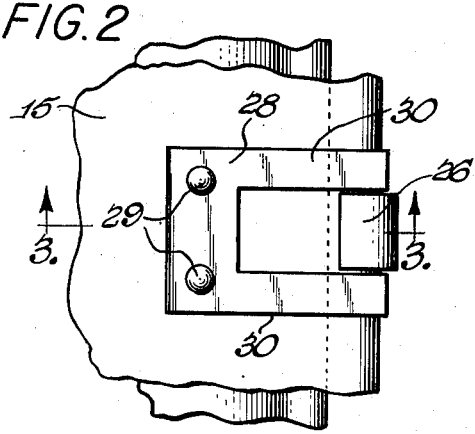
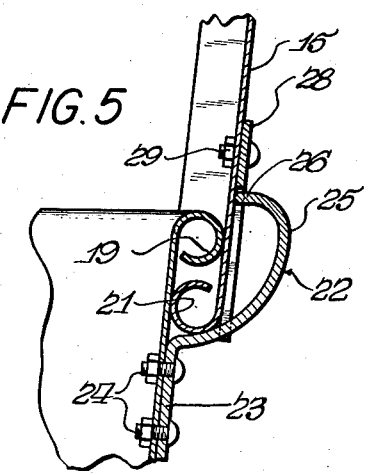
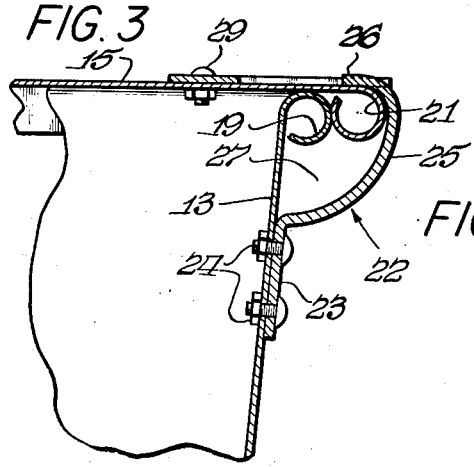
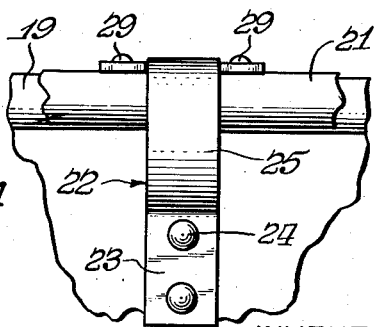
INVENTORS
RONALD E. PENFOLD
CLARK H. FORSYTH
ATTORNEY

United States Patent Office 2,830,725
Patented Apr. 15, 1958

2,830,725

HOPPER LID AND HINGE

Ronald E. Penfold, Aldershot, Ontario, and Clark H. Forsyth, Hamilton, Ontario, Canada, assignors to International Harvester Company, a corporation of New Jersey Application September 6, 1955, Serial No. 532,408

1 Claim. (Cl. 220—31)

This invention relates to a novel hinge construction for the lid of a grain drill hopper or the like. The invention is particularly adapted for grain drill hoppers, but is equally adaptable for use with the hoppers of fertilizer distributors and the like.

A grain drill and its hopper are usually elongated and extend transversely of the direction of travel over a field to be seeded, and the drill includes a plurality of earth-penetrating elements adapted to form furrows for the deposition of material from the hopper. The elongated box or seed hopper is customarily made of relatively light sheet metal, and the hopper and furrow opener units are mounted upon a wheeled frame adapted to be drawn by a tractor or other source of power. The hopper or box comprises front and rear elongated walls connected by end walls, and a cover member or lid is provided and is hinged usually along the rear wall.

The construction of a hopper lid and hinge assembly is usually characterized by simplicity and economy, and hinge means used in the past has been of sturdy construction, but of such a character as to allow moisture to seep into the box and contaminate the contents.

The present invention has for its object the provision of an improved lid and hinge construction for the hopper of a grain drill or the like which is not only efficient and economical, but is of sturdy construction and avoids the difficulties inherent in prior constructions.

Another object of the invention is the provision of an improved hinge construction for the hopper of a grain drill or the like which is not only of simple construction but is designed to keep moisture from seeping into the box.

Other objects and advantages of the invention will become clear from the following detailed description when read in conjunction with the accompanying drawings wherein:

Figure 1 is a view from one end, partly in section, of a grain drill hopper incorporating the features of this invention;

Figure 2 is an enlarged plan view of a detail illustrating one of the hinge means for connecting the hopper lid to the box;

Figure 3 is a section taken on the line 3—3 of Figure 2, showing the position of the parts when the hopper lid is in closed position;

Figure 4 is a rear elevation of the structure shown in Figure 2, and

Figure 5 is a sectional view similar to Figure 3 showing the position of the parts when the hopper lid is in raised position.

With reference to the drawings, and particularly Figure 1, the grain drill hopper incorporating features of this invention is designated by the numeral 10. The hopper 10 is mounted upon a conventional frame 11 supported by wheels, not shown, at each end of the frame. The grain box is schematically illustrated in Figure 1, where-in only the end thereof is shown, but it may be understood that the box comprises elongated front and rear walls 12 and 13, respectively, a bottom portion 14 from which material is discharged from the hopper, and a lid 15. The walls 12 and 13 are connected at each end by an end wall 16, and a plurality of hinge means, generally designated at 17, are provided at spaced locations along the rear wall of the hopper to form the means by which lid 15 is connected thereto.

The upper ends of the walls 12 and 13, respectively, terminate in outwardly rolled beads 18 and 19 extending the entire length of the box. The forward edge of the lid 15 is rolled downwardly to form a bead 20 which, when the lid is closed, lies outwardly of and its periphery engages the periphery of the adjacent bead 18 on the forward end of the box. Similarly, the rear edge of the lid 15 is rolled downwardly to form a bead 21 which lies outwardly of bead 19, in substantially horizontal alignment therewith and engaging the periphery thereof.

In the construction described it will be observed that the lid 15 makes the hopper substantially waterproof. Rain water runs off the beads 20 and 21 and cannot penetrate between them and the adjacent beads of the main body of the hopper.

The hinges 17 are adapted to retain the lid 15 on the hopper without impairing the waterproof characteristics of the box. Each hinge 17 includes a hinge member 22 having an attaching portion 23 secured to the upper part of the rear wall 13 of the hopper by suitable means such as two or more bolts 24.

The upper end 25 of member 22 is bent outwardly and curved upwardly and forwardly, terminating in an end portion 26 spaced from bead 19 a distance less than the diameter of the rear bead 21 on lid 15, and forming with wall 13 and bead 19 of the hopper a socket 27 in which the bead 21 is received and confined in open and closed positions of the lid.

It will be noted in Figure 3 that the end 26 of member 22 terminates above the upper end of bead 19 a distance approximately the thickness of the lid 15, and that it terminates rearwardly of the bead 19, as indicated in Figure 5, sufficiently to accommodate a slight rearward tilt in the lid 15 when it is raised to maintain it in open position, when desired. When the lid 15 is raised, the head 21 rides around the outer periphery of bead 19 and the inner surface of the socket portion 25 and comes to rest in the position of Figure 5 with bead 21 at the bottom of the socket portion 25 of the hinge member. In this position with the hopper lid open there is no opening between bead 19 and lid 15. This is important because in filling the hopper with grain the lid is often used as a backboard, and with this construction grain cannot penetrate into the hinge socket 27.

It will also be noted that no openings are provided between the lid 15 and the main body of the hopper for the penetration of moisture therein. Moisture flowing over the rear edge of the lid 15 and bead 21 cannot get into the box but flows into the socket 27 and out the sides thereof.

The lid 15 is prevented from sliding endwise of the box axially of the beads 19 and 21 by the provision of a U-shaped retainer bracket 28 affixed to the lid by two or more bolts 29 and having arms 30 extending rearwardly and adapted to straddle the upper end 26 of hinge member 22. A bracket 28 is provided for each hinge member 22 and the arms 30 of the bracket straddle and confine the upper end 26 of the hinge member 22.

From the foregoing it should be clear that there is described herein a novel hinge construction for a grain drill lid which is not only efficient and economical but performs the important function of maintaining the hopper waterproof. It should be understood that the invention has been described in its preferred embodiment and that modifications may be made therein without departing from the spirit of the invention or the scope of the appended claim.

What is claimed is:

In a hopper for grain drills and the like having elongated generally vertical front and rear walls, and wherein the rear wall terminates at its upper end in an outwardly turned substantially cylindrical rolled bead, a hopper lid adapted to span said walls having its rear edge terminating in a downwardly turned substantially cylindrical rolled bead corresponding to and engaging the adjacent wall bead in generally horizontal alignment therewith when the lid is in closed position, a retaining member secured to the outer surface of said rear wall having an arcuate portion extending away from said wall including an upwardly and forwardly bent portion generally concentric with the bead on said lid when the lid is closed to form a socket and terminating in an end portion engageable wtih the upper surface of said lid, said socket being adapted to confine said bead in close association to form a hinge and the spacing between said end portion of the retaining member and the bead on said rear wall being less than the diameter of the bead on said lid to prevent displacement of the lid from the hopper.

References Cited in the file of this patent

UNITED STATES PATENTS

| | | |
|---|---|---|
| 1,164,364 | Krause | Dec. 14, 1915 |
| 1,213,157 | Conway | Jan. 23, 1917 |
| 1,637,859 | Hilges | Aug. 2, 1927 |

FOREIGN PATENTS

| | | |
|---|---|---|
| 645,135 | France | June 26, 1928 |
| 465,841 | Germany | Sept. 25, 1928 |